March 3, 1964

G. L. HITZ 3,123,334

ROTARY GATE VALVE

Filed Oct. 9, 1959

Gifford L. Hitz
INVENTOR.

March 3, 1964

G. L. HITZ 3,123,334

ROTARY GATE VALVE

Filed Oct. 9, 1959

Gifford L. Hitz
INVENTOR.

United States Patent Office 3,123,334
Patented Mar. 3, 1964

3,123,334
ROTARY GATE VALVE
Gifford L. Hitz, 1661 Bel Air Road, Los Angeles, Calif.
Filed Oct. 9, 1959, Ser. No. 845,545
4 Claims. (Cl. 251—147)

This invention relates to valves, and valve and pipe or tube end closure and sealing apparatus. More particularly it deals with apparatuses for effecting closure by swinging across the aperture in the tubular member to be closed a segment of a hemispherical gate, trunnion mounted directly on the tubular member.

A well known method of valve closure is that of sliding a flat or cylindrical gate across the opening, such gate being guided by flat or cylindrical gibs. It is an object of this invention to provide a more compact form of gate, guided more simply and accurately by inexpensive, compact trunnion mountings.

Another well known method of valve closure consists of rotating a plug cylinder, ball, or half ball, provided with a hole or aperture arranged to provide open passage thru the plug or ball, or, in the alternate position to close off the through opening in the tube. Such plug or ball may be free floating in exterior seats (except for connected turning means), or may be trunnion mounted to an external case. It is an object of this invention to provide a closure gate by means of pivoting a segment of a hemispherically shaped shell member on trunnions, mounted internally of the continuing arc of the hemisphere, where it will be in close proximity to and in accurate and positive alignment with a mating seat or seal.

A further object of the invention is to combine the desirable features of a simple sliding gate valve with the compactness of a rotating ball or plug valve.

A further object of this invention is to provide a pivoted swinging gate type closure of better stress characteristics than that of a flat sliding gate, a convex or concave pressure vessel closure being well known to be less susceptible to deflection or rupture than a like flat closure.

In its simplest form this invention provides an easily opened and shut closure for the open end of a pipe or tube by mounting a pair of trunnion stubs on opposite sides of the exterior of the pipe to be closed in proper proximity to the end, inserting an O-ring in a prepared groove in the end of the pipe, mounting a segment of a hemisphere on flat plates which have been drilled to fit over the trunnion stubs, this assembly being so proportioned that the rubber O-ring makes continuous contact with the interior face of the hemisphere segment when this is swung over the end of the pipe.

In providing a closure for a continuous run of pipe the identical method is used, and in addition an outer spherical type case is fastened to the pipe continuing beyond the closure point, this case fitting over and surrounding the tunnnion and gate assembly and being fastened to the originating pipe in proper relationship to allow a gap between the end of the originating pipe and the continuing pipe just wide enough to pass the thickness of the hemispherical gate.

Further objects and features of the invention as well as the details of an illustrative embodiment will be more fully understood from the following detailed description of the drawings, in which.

Figure 1:
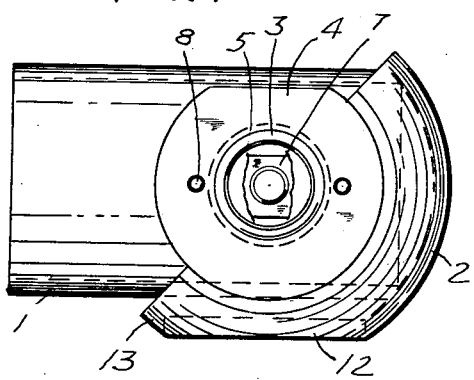
FIG. 1 is a diagrammatic plan view of one form of apparatus arranged to carry out the invention in its simpler concept in closing off the open end of a pipe.
Figure 2:
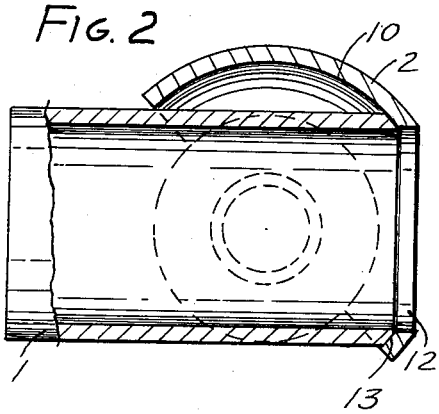
FIG. 2 is a view of the same apparatus showing the valve in an open position.

Referring to the drawings, FIG. 1 shows a pipe 1, on which has been mounted a pair of trunnion stubs 3 on opposite exterior sides of the pipe. Closure gate member 2 rotatably mounted to stubs 3 by flat plates 4 top and bottom and held in vertical alignment with pipe 2 by spacer 5 is shown swung across end of pipe 1 effectively closing off the end of the pipe. Rotary motion of the gate 2 is accomplished by turned shaft 6 which is provided with a hole 9 for insertion of additional driving handles if desired, and which is attached to flat driver plate 7 which drives plate 4 through driving pins 8. FIG. 2 shows in section how gate 2, of which inside surface 10 is prepared to act as a sealing surface, can be rotated to bring aperture 12 in alignment with the pipe opening to permit full flow through the apparatus. Surface 13 of gate 2 is thus brought into position to protect the sealing surfaces of the end of the pipe. Where operating conditions do not require such protection, the portion of the gate 2 comprising aperture 12 and surface 13 can be omitted.

Figure 3:
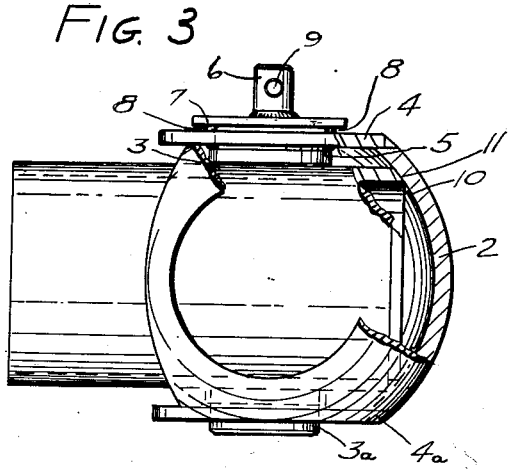
FIG. 3 is an elevation view of the same apparatus showing the method of mounting the trunnions and sealing the closure.

FIG. 3 shows the relative mounting position of fixed trunnion stubs 3 and 3a on pipe 1 and shows the valve in a closed position with gate 2 swung across the pipe opening and sealing surface 10 of the gate effecting sealing closure against end surface 11 of pipe 1.

Figure 4:
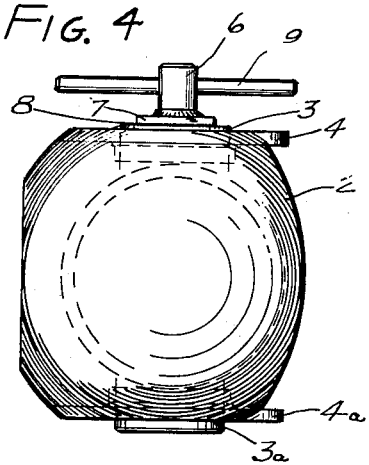
FIG. 4 is an end view of the same apparatus in closed position.

FIG. 4 shows a handle 9 inserted in shaft 6 to assist in effecting rotation of gate member 2.

Figure 5:
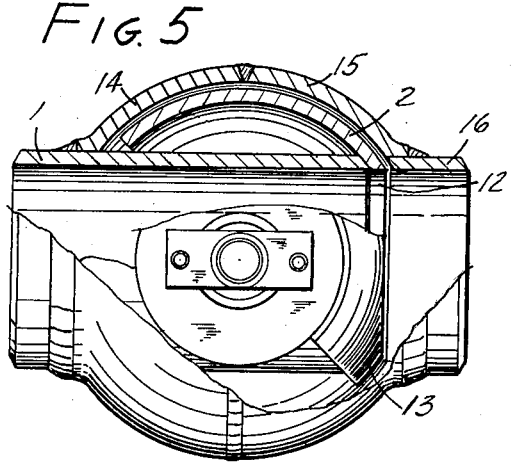
FIG. 5 is a plan view of a pipe run closure or valve in an open position showing the full flow opening.
Figure 6:
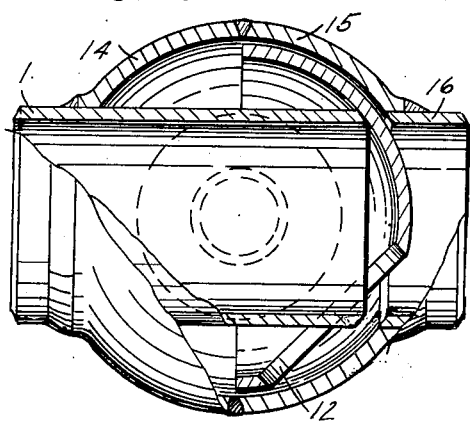
FIG. 6 is a similar view showing the action of the gate member in swinging toward closed position across the pipe run opening.

FIG. 5 shows the apparatus illustrated in FIGS. 1, 2, 3 and 4 applied to valving a continuing pipe run, and shows the addition to the apparatus shown in those figures, of continuing pipe 16, and outer shells 14 and 15 attached respectively to pipes 1 and 16 and to each other to form a continuous fluid tight support for the pipes 1 and 16, as well as to protect the apparatus from foreign material particularly where used underground.

Figure 7:
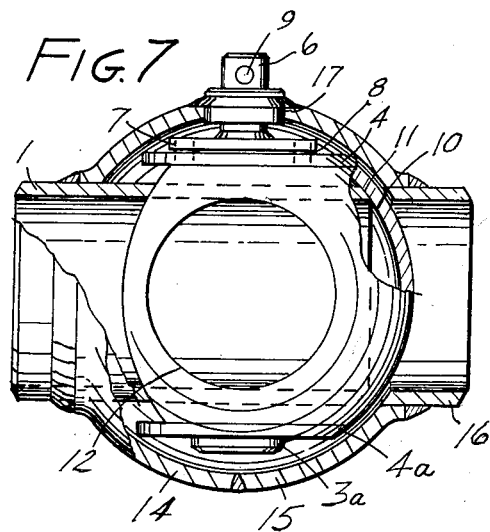
FIG. 7 is an elevation view of the valve in closed position showing method of sealing between the pipe end surface and the inside of the gate.
Figure 8:
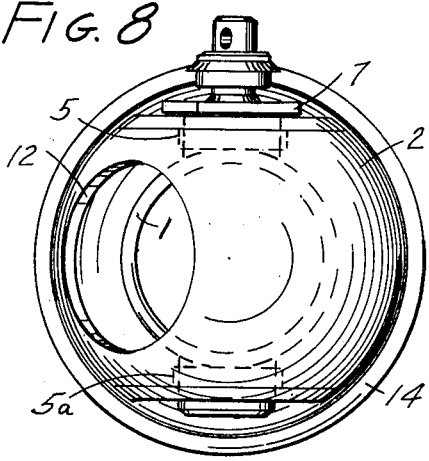
FIG. 8 is an end view with half of the case and pipe run continuation removed to show the action of the gate in rotating across the pipe run opening into closed position.
Figure 9:
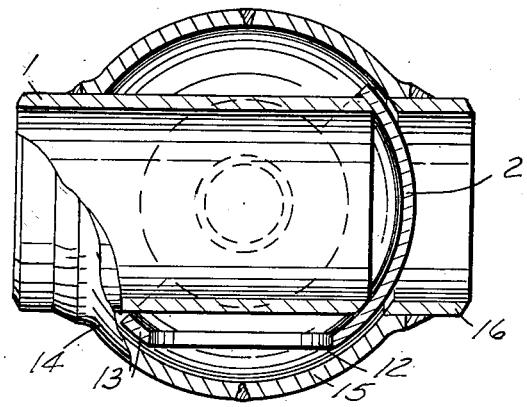
FIG. 9 is a plan view showing the valve in closed position.

FIG. 7 shows collar 17 attached to shells 14 and 15 and providing a support for shaft 6. It should be noted that sealing closure is effected between end surface 11 of pipe 1 and inside surface 10 of gate 2, which are held in close alignment by the attachment of trunnion stubs 3 and 3a to pipe 1. No sealing or seating is required as shown, between the outer surface of gate 2 and shell 15 or pipe 16, although an additional sealing member could obviously be added.

This unique sealing arrangement is entirely different from the usual apparatus conventionally in use in ball or plug valves where the ball or plug seats and seals against its outer surfaces, and is either supported and maintained in alignment by these seats, or is supported by trunnions mounted to the outside shell rather than to the pipe, and thus being difficult to maintain in alignment under service conditions.

Figure 13:
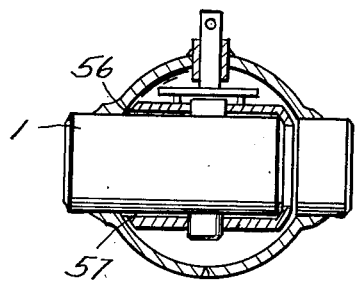
FIG. 13 is an elevation view of the arrangement shown in FIG. 12.
Figure 12:
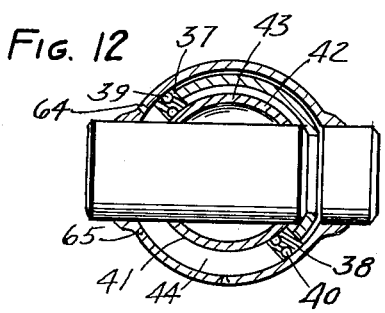
FIG. 12 is a plan view of the valve showing a fluid pressure method of swinging the gate member open and shut.

FIGS. 12 and 13 show a fluid pressure rotary actuation of gate 2 by use of wing piston members 37 and 38 attached to gate 2, and carrying seals 39 and 40 bearing against the inside of outer shells 14 and 15 and the outside of spherical members 41 and 42. In order to complete actuator enclosure, plates 56 and 57 are attached to inner members 41 and 42. Fluid pressure can be alternately admitted and expelled through ports 64 and 65 to which suitable flow lines and valving can be connected.

Figure 10:
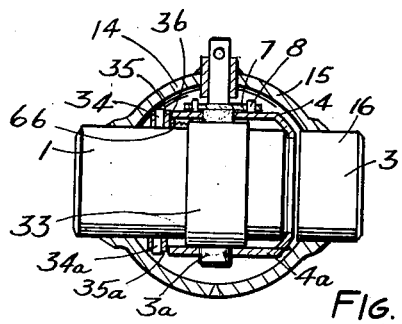
FIG. 10 is an elevation view of the valve showing the gate and trunnion members slidably mounted, motion being accomplished by cam action.
Figure 11:
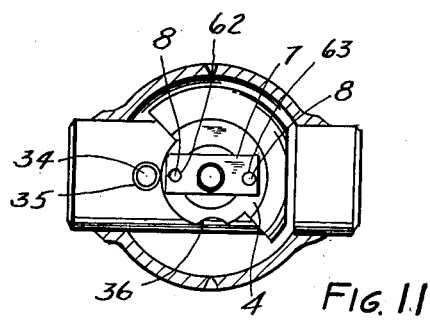
FIG. 11 is a plan view of the apparatus shown in FIG. 10.

FIGS. 10 and 11 show trunnion stubs 3 and 3a attached to ring 33 slidably positioned around pipe 1, and maintained in alignment by tension spring 66 causing plates 4 and 4a to bear against roller 34 and 34a running on pins 35 and 35a which are attached to pipe 1. Rotation of plates 4 and 4a brings cam indent 36 to bear against roller 34 permitting ring 33 to move away from pipe end surface 11 and thus drawing gate 2 into tight sealing contact with surface 11 by action of tension spring 66.

Figure 14:
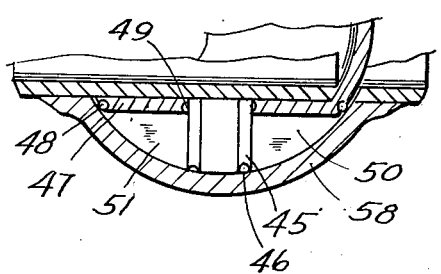
FIG. 14 is a section of the valve showing another form of rotary actuation of the gate member by fluid pressure.
Figure 15:
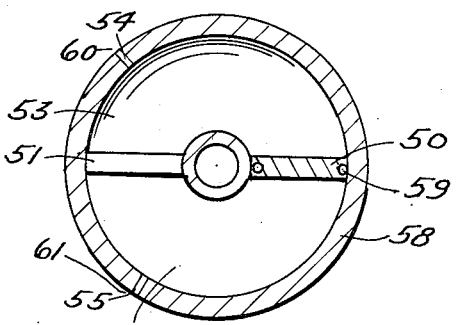
FIG. 15 is a plan view of the rotary actuator shown in FIG. 14.

FIGS. 14 and 15 show another means of rotary actuation of gate 2 comprising in effect an integral rotary actuator of conventional design in which the fixed vane 51 it attached to shell 58 (which replaces the lower portion of shells 14 and 15) and the movable vane 50 is attached to gate 2 through plate 47 which replaces plate 4a of previous figures. Rotary actuation is accomplished by admitting fluid pressure alternately thru ports 54 and 55 to chambers 53 and 52 respectively.

Summarizing, particularly with respect to subject matter claimed and shown, the valve assembly includes a length of pipe 1 and 16 with a toroidal aperture of uniform width around the pipe creating complete discontinuity and in effect separating the pipe into two sections. A pair of trunnion pivot stubs 3 are attached solely to opposite exterior sides of one section 1 of pipe, and there is provided a hemispherical shell segment gate member 2 the radius of which is approximately fifty percent or more greater than the radius of the pipe and of a thickness slightly less than the width of the aperture between the two sections of pipe, the gate being rotatably attached to the trunnion stubs. The central point of the common center line of the trunnions is seen to be located at a distance from the end surface of the section 1 of pipe to which they are attached, equal to the inside radius of the gate member.

An outer truncated spherical shell or case 14 and 15 of inside diameter slightly larger than the outer diameter of the hemispherical gate member is attached at one truncated end to the pipe section 1, and at the other truncated end to pipe section 16, the center point of the spherical case being located at a common point with the center point of the gate. A turning member 7 is rotatably mounted in the shell 14 and 15 and detachably coupled at 8 with the gate member to effect rotation thereof around the trunnion stubs. The hemispherical gate member is seen to have an opening 12 therein in one quadrant, approximately equal to the diameter of the pipe to permit full flow through the pipe when rotated into alignment with the pipe run opening. Also, the interior surface 10 of the other quadrant of the gate mates with the exterior end surface 11 of the section 1 of pipe on which is mounted, to provide a complete closure of the pipe run, when rotated into alignment with the pipe run.

In FIG. 10, means is provided at 4, 4a, 34, 34a, 36 and 66 to effect motion of ring 33 carrying the gate, so as to increase and decrease the pipe end and gate contact pressure, the numbered elements being more fully described above.

Figure 16:
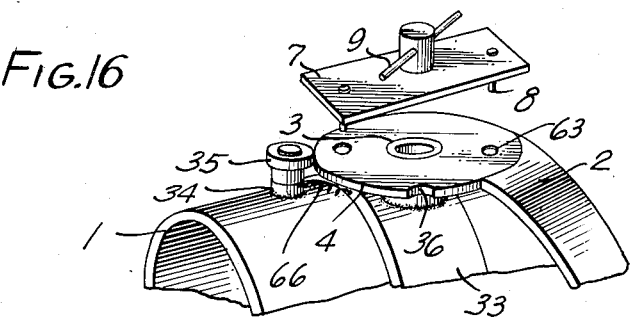
FIG. 16 is a perspective showing the cam arrangement for providing motion to the slidable ring, and illustrated in FIGS. 10 and 11.

In FIG. 16 a loose connection is shown as provided between pins 8 and apertures 63 to allow relative movement of the gate-ring assembly, holes 63 being larger in diameter than pins 8.

I claim:

1. An apparatus or valve assembly comprising a length of pipe with a toroidal aperture of uniform width around the pipe creating complete discontinuity and in effect separating the pipe into two sections, a pair of trunnion pivot stubs attached solely to opposite exterior sides of one of the sections of pipe, a hemispherical shell segment gate member the radius of which is approximately fifty percent or more greater than the radius of the pipe and of a thickness slightly less than the width of the aperture between the two sections of pipe, rotatably attached to the trunnion stubs, the central point of the common center line of the trunnions being located at a distance from the end surface of the section of pipe to which they are attached, equal to the inside radius of the hemispherical segment gate member; an outer truncated spherical shell or case of inside diameter slightly larger than the outer diameter of the hemispherical gate member and attached at one truncated end to the pipe carrying the trunnions, and at the other end to the other section of pipe, the center point of the sphere being located at a common point with the center point of the hemispherical gate member, and a turning member rotatably mounted in the outer spherical shell member and detachably coupled with the hemispherical gate member to effect rotation thereof around the trunnion stubs, the hemispherical gate member having an opening therein in one quadrant, approximately equal to the diameter of the pipe to permit full flow through the pipe when rotated into alignment with the pipe run opening, the interior surface of the other quadrant of the hemispherical gate member mating with the exterior end surface of the section of pipe on which it is mounted to provide a complete closure of the pipe run, when rotated into alignment with the pipe run.

2. An apparatus or valve assembly comprising a length of pipe with a toroidal aperture of uniform width around the pipe creating complete discontinuity and in effect separating the pipe into two sections, a pair of trunnion pivot stubs attached solely to opposite exterior sides of a ring member slidably positioned around one of the sections of pipe, a hemispherical shell segment gate member the radius of which is approximately fifty percent or more greater than the radius of the pipe and of a thickness slightly less than the width of the gap between the two sections of pipe, rotatably attached to the trunnion stubs, the central point of the common center line of the trunnions being located at a distance from the end surface of the section of pipe around which the ring is slidably mounted, equal approximately to the inside radius of the hemispherical segment; an outer truncated spherical shell or case of inside diameter slightly larger than the outer diameter of the hemispherical gate member and attached at one truncated end to the pipe carrying the ring mounted trunnions, and at the other end to the other section of pipe, the center point of the sphere being located at a common point with the center point of the hemispherical gate member, and a turning member rotatably mounted in the outer spherical shell member and detachably coupled with the hemispherical gate member to effect rotation thereof around the trunnion stubs, and means to effect motion of the ring carrying the trunnion mounted hemispherical gate member, so as to increase or decrease the pipe end and gate contact pressure; the hemispherical gate member having an opening therein in one quadrant, approximately equal to the diameter of the pipe to permit full flow through the pipe when rotated into alignment with the pipe run opening, the interior surface of the other quadrant of the hemispherical gate member mating with the exterior end surface of the section of pipe around which the slidable ring is mounted, to provide a complete closure of the pipe run, when rotated into alignment with the pipe run.

3. An apparatus or valve assembly comprising a length of pipe with a toroidal aperture of uniform width around the pipe creating complete discontinuity and in effect separating the pipe into two sections, a pair of trunnion pivot stubs attached solely to opposite exterior sides of a ring member slidably positioned around one of the sections of pipe, a hemispherical shell segment gate member the radius of which is approximately fifty percent or more greater than the radius of the pipe and of a thickness slightly less than the width of the gap between the two sections of pipe, rotatably attached by flat round plates to the trunnions, the central point of the common center line of the trunnions being located at a distance from the end surface of the section of pipe around which the ring is slidably mounted, equal approximately to the inside radius of the hemispherical segment; an outer truncated spherical shell or case of inside diameter slightly larger than the outer diameter of the hemispherical gate member and attached at one truncated end to the pipe carrying the ring mounted trunnions, and at the other end to the other section of pipe, the center point of the sphere being located at a common point with the center point of the hemispherical gate member, and a turning member rotatably mounted in the outer spherical shell member and detachably coupled with the hemispherical gate member to effect rotation thereof around the trunnion stubs, and means to effect motion of the ring carrying the trunnion mounted hemispherical gate member, so as to increase or decrease the pipe end and gate contact pressure, said means including a tension spring attached to the slidable ring and tending to draw the ring away from the pipe end to be sealed, said means further including rollers mounted on pins attached to the one section of the pipe and bearing against the hemispherical gate mounting plates, the edges of said plates being formed with indentations whereby upon seating of the rollers in the indentations the tension spring moves the ring away from the pipe end sealing surface and draws the gate member into tight sealing contact with the pipe sealing surface; the hemispherical gate member having an opening therein in one quadrant, approximately equal to the diameter of the pipe to permit full flow through the pipe when rotated into alignment with the pipe run opening, the interior surface of the other quadrant of the hemispherical gate member mating with the exterior end surface of the section of pipe around which the slidable ring is mounted, to provide a complete closure of the pipe run, when rotated into alignment with the pipe run.

4. An apparatus for alternately closing and providing a full diameter opening in the end of a pipe, comprising a carrier mounted to move along the pipe, a pair of trunnion stubs attached to the carrier at opposite sides of the pipe, a hemispherical shell segment gate of radius approximately fifty percent or more greater than that of the pipe rotatably attached to the trunnion stubs, the central point of the common center line of the trunnions being located at a distance from the end surface of the pipe approximately equal to the inside radius of the hemispherical segment, and means to move the carrier along the pipe to seat the gate at the pipe end when the gate is rotated to close said end, and to unseat the gate at said pipe end when the gate is rotated to open said end.

References Cited in the file of this patent

UNITED STATES PATENTS

| 926,905 | Southerland | July 6, 1909 |
| 2,263,907 | Stanton | Nov. 25, 1941 |
| 2,419,243 | Allen | Apr. 22, 1947 |
| 2,549,337 | Seewer | Apr. 17, 1951 |
| 2,653,004 | Schnyder | Sept. 22, 1953 |

FOREIGN PATENTS

| 511,268 | Germany | of 1930 |